(12) United States Patent
Chen et al.

(10) Patent No.: US 9,979,345 B1
(45) Date of Patent: May 22, 2018

(54) ROTOR DRIVING SYSTEM AND METHOD FOR DRIVING ROTOR

(71) Applicant: INDUSTRIAL TECHNOLOGY RESEARCH INSTITUTE, Hsinchu (TW)

(72) Inventors: Chao-Yun Chen, Hsinchu County (TW); Chi-Ting Yeh, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days. days.

(21) Appl. No.: 15/644,800

(22) Filed: Jul. 9, 2017

(30) Foreign Application Priority Data

May 17, 2017 (TW) .............................. 106116381 A (51) Int. Cl.
*H02P 6/00* (2016.01)
*H02P 29/00* (2016.01)
(52) U.S. Cl.
CPC .......... *H02P 29/00* (2013.01); *H02P 2205/07* (2013.01)
(58) Field of Classification Search
CPC ...... H02P 1/00; H02P 3/00; H02P 6/00; H02P 21/00; H02P 27/04; H02P 27/06; H02P 41/00
USPC ............ 318/400.01, 400.02, 400.14, 400.15, 318/400.32, 700, 400.37, 400.38, 701, 318/727, 779, 799, 800, 801; 388/800, 388/811, 819, 909; 363/21.1, 40, 44, 95, 363/120, 174, 175; 705/341; 707/751
See application file for complete search history.

(56) References Cited

U.S. PATENT DOCUMENTS

| | | | |
|---|---|---|---|
| 6,289,072 | B1 | 9/2001 | Hubbard et al. |
| 7,053,582 | B2 | 5/2006 | Ueyama et al. |
| 2005/0102116 | A1 | 5/2005 | Bai et al. |
| 2012/0212167 | A1 | 8/2012 | Wu et al. |

(Continued)

FOREIGN PATENT DOCUMENTS

| | | |
|---|---|---|
| CN | 101012852 A | 8/2007 |
| CN | 101329359 A | 12/2008 |
| CN | 101977000 A | 2/2011 |

(Continued)

OTHER PUBLICATIONS

TW Office Action dated Jan. 2, 2018 in application No. 106116381.

*Primary Examiner* — Antony M Paul
(74) *Attorney, Agent, or Firm* — Maschoff Brennan (57) ABSTRACT

A rotor driving system has a rotor, a revolution sensor, a sensing circuit, a controller, and a rotor driver. The revolution sensor is configured to sense a revolution frequency of the rotor so as to generate a measurement signal. The sensing circuit is electrically connected to the revolution sensor and configured to convert the measurement signal into a current revolution measured value. The controller is electrically connected to the sensing circuit and configured to generate an estimated revolution frequency based on a historical revolution measured value, the current revolution measured value, and a reference value, and generate a rotor driving signal based on the estimated revolution frequency and a revolution control signal. The rotor driver is electrically connected to the controller and configured to drive the rotor to rotate based on the rotor driving signal.

10 Claims, 8 Drawing Sheets

(56) References Cited

U.S. PATENT DOCUMENTS

2017/0025979 A1* 1/2017 Wilson .................... H02P 23/04

FOREIGN PATENT DOCUMENTS

| | | |
|---|---|---|
| TW | 200848764 A | 12/2008 |
| TW | 200914833 A | 4/2009 |
| TW | I344003 B | 6/2011 |
| TW | I476409 B | 3/2015 |
| WO | 2008/154757 A1 | 12/2008 |

* cited by examiner

ROTOR DRIVING SYSTEM AND METHOD FOR DRIVING ROTOR

RELATED APPLICATIONS

This application claims priority to Taiwan Application Serial Number 106116381, filed May 17, 2017, which is incorporated by reference herein in its entirety.

BACKGROUND

Technical Field

The disclosure relates to a rotor driving system and method for driving rotor, and particularly to a rotor driving system and method for driving rotor with high accuracy.

Description of Related Art

A rotor, also called as shaft, is an important element in electric generator, motor, or engine. Generally, when the rotor rotates at a high revolution frequency, the inertia center of the rotor is different from the rotation geometric center of the rotor because of temperature, manufacturing tolerance, etc., and therefore results in the unbalance force. The unbalance force is proportional to the square of the revolution frequency, so the unbalance force is getting larger when the revolution frequency is getting higher. The conventional rotor controller locates the rotor in its geometric center. However, when the revolution frequency is getting larger, the unbalance force is getting larger and the rotor vibrates more and the control force needed for locating the rotor is getting larger. Hence, the control force is usually determined based on the revolution frequency.

When determining the control force based on the revolution frequency, the control force may be determined based on the instruction indicating the target revolution frequency. However, the revolution frequency indicated by that instruction is usually different from the actual revolution frequency, so the control force generated based on the instruction can rarely locate the rotor well. Hence, determining the control force based on the sensed revolution frequency is proposed. However, there may be error in the sensed revolution frequency because of the vibration or slip, so the calculated control force may be inappropriate and make the controller or the rotor unstable.

SUMMARY

The rotor driving system according to one embodiment of the present disclosure includes a rotor, a revolution sensor, a sensing circuit, a controller, and a rotor driver. The revolution sensor is configured to sense a revolution frequency of the rotor so as to generate a measurement signal. The sensing circuit is electrically connected to the revolution sensor and configured to convert the measurement signal into a current revolution measured value. The controller is electrically connected to the sensing circuit and configured to generate an estimated revolution frequency based on a historical revolution measured value, the current revolution measured value, and a reference value, and generate a rotor driving signal based on the estimated revolution frequency and a revolution control signal. The rotor driver is electrically connected to the controller and configured to drive the rotor to rotate based on the rotor driving signal.

The method for driving rotor according to one embodiment of the present disclosure includes the step of: sensing a revolution frequency of a rotor so as to generate a measurement signal; converting the measurement signal into a current revolution measured value; generating an estimated revolution frequency based on a historical revolution measured value, the current revolution measured value, and a reference value; and generating a rotor driving signal to drive the rotor based on the estimated revolution frequency and a revolution control signal.

BRIEF DESCRIPTION OF THE DRAWINGS

The disclosure can be more understood by reading the following detailed description of the embodiments, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
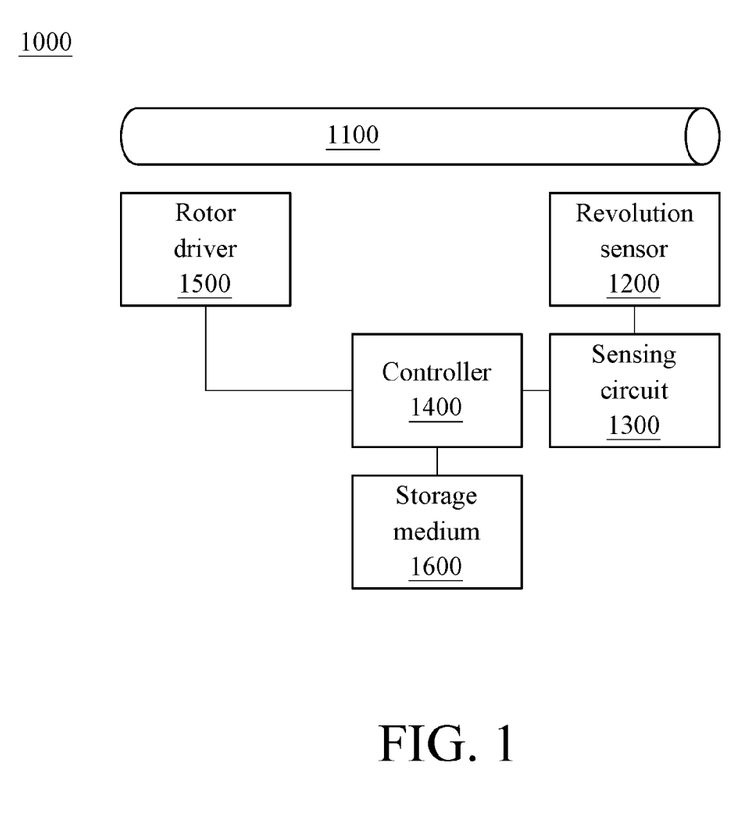
FIG. 1 is a schematic diagram of a rotor driving system according to one embodiment of the present disclosure.

Please refer to FIG. 1, which is a schematic diagram of a rotor driving system according to one embodiment of the present disclosure. As shown in FIG. 1, the rotor driving system 1000 according to one embodiment of the present disclosure has a rotor 1100, a revolution sensor 1200, a sensing circuit 1300, a controller 1400, and a rotor driver 1500.

The rotor 1100 is, for example but not limited to, an engine, a motor, an electric generator, or other shafts in rotor machinery. The rotor 1100 is driven by the rotor driver 1500 to rotate. In one embodiment, the rotor driver 1500 is a contact rotor driver. That is, the rotor driver 1500 directly contacts the rotor 1100 so as to make the rotor 1100 to rotate or the rotor driver 1500 makes the rotor 1100 to rotate via a transmission mechanism such as a gear set or a strap. In another embodiment, the rotor driver 1500 is a non-contact rotor driver. That is, the rotor driver 1500 neither contacts the rotor 1100 nor makes the rotor 1100 to rotate via any element contacting the rotor 1100.

Figure 2:
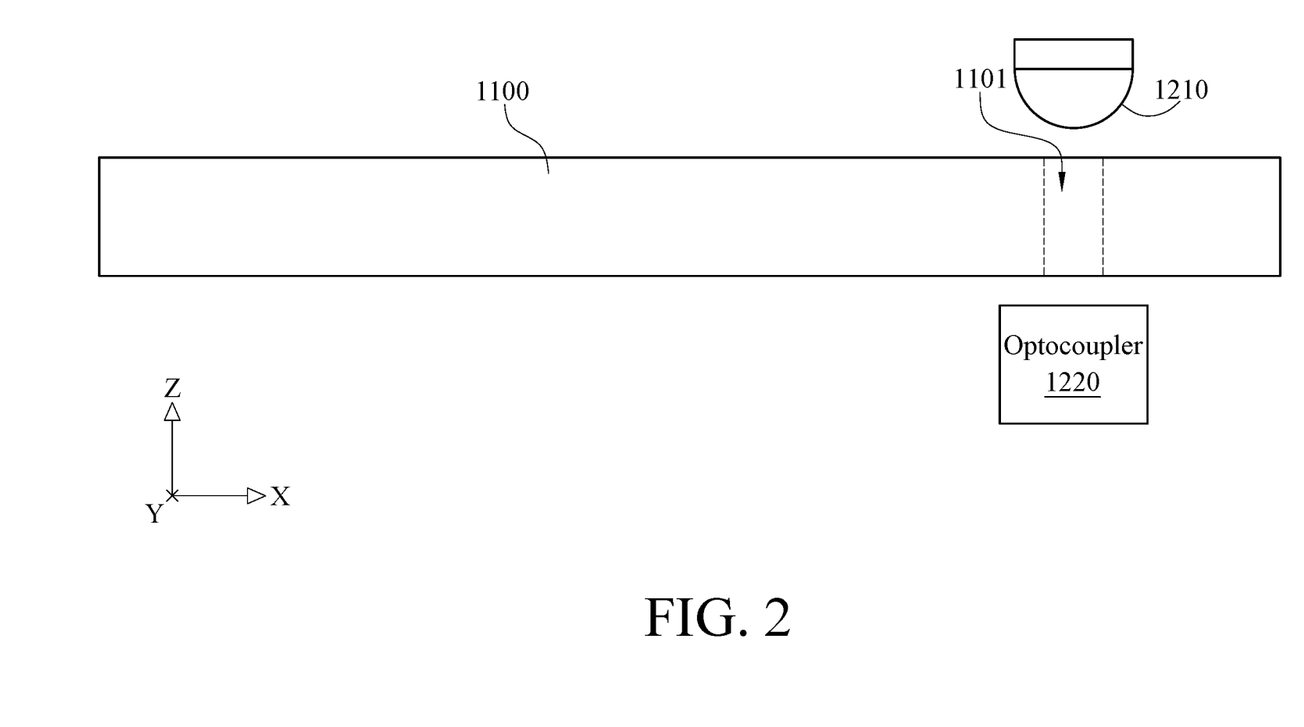
FIG. 2 is an arrangement diagram about the rotor and the revolution sensor according to one embodiment of the present disclosure.

The revolution sensor 1200 is configured to sense the revolution frequency of the rotor 1100 to generate a measurement signal. In one embodiment, the revolution sensor 1200 is, for example but not limited to, a revolution sensor implemented with an optocoupler (optical coupler) or a Hall effect sensor. Please refer to FIG. 2 for the revolution sensor 1200 implemented with the optocoupler, wherein FIG. 2 is an arrangement diagram about the rotor and the revolution sensor according to one embodiment of the present disclosure. As shown in FIG. 2, the rotor 1100 is arranged parallel to the X-axis and has a through hole 1101 of which the extension direction is perpendicular to the X-axis. The revolution sensor 1200 includes a light source 1210 and an optocoupler 1220. An extension line from the light source 1210 to the optocoupler 1220 is parallel to the Z-axis. When the rotor 1100 rotates to an adequate position so that the extension direction of the through hole 1101 is substantially parallel to the Z-axis, the light emitted from the light source 1210 transmits via the through hole 1101 and is received by the optocoupler 1220. Meanwhile, the signal generated by the optocoupler 1220 is, for example, at a high voltage level. When the extension direction of the through hole 1101 is not substantially parallel to the Z-axis, the light emitted from the light source 1210 is not received by the optocoupler 1220 and the signal generated by the optocoupler 1220 is, for example, at a low voltage level. The definition of the "substantially parallel" is, for example but not limited to, when an angle between the extension direction of the through hole 1101 and the Z-axis is less than 5 degree. The angle may be determined by one ordinary skilled in the art according to the need and/or the processing technique. Hence, the measurement signal generated by the optocoupler 1220 has four transitions at voltage level, twice from low voltage to high voltage and twice from high voltage to low voltage, when the rotor 1100 rotates one round. In other words, the frequency of the measurement signal is, in theory, two times as the revolution frequency of the rotor 1100. However, if the rotor 1100 has a position shift owing to the vibration, the light emitted from the light source 1210 might neither pass the through hole 1101 nor be received by the optocoupler 1220. Hence, the measurement signal generated by the optocoupler 1220 may have only two transitions in voltage level or no transition when the rotor 1100 rotates one round, and the frequency of the measurement signal is less than twice of the revolution frequency of the rotor 1100.

Figure 3:
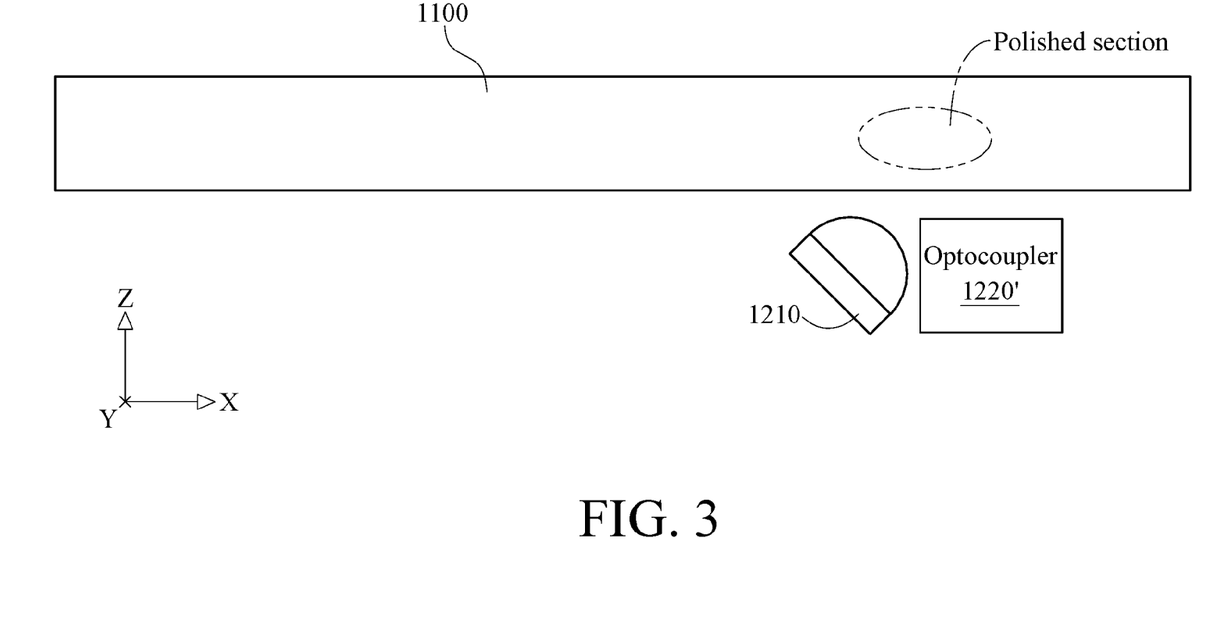
FIG. 3 is an arrangement diagram about the rotor and the revolution sensor according to one embodiment of the present disclosure.

Although the revolution sensor implemented with the optocoupler requires the rotor having a through hole, one ordinary skilled in the art may design the revolution sensor in a different way. For example, please refer to FIG. 3, which is an arrangement diagram about the rotor and the revolution sensor according to one embodiment of the present disclosure. In the embodiment of FIG. 3, the light source 1210' and the optocoupler 1220' are both located at the same side of the rotor 1100. The rotor 1100 is circular-polished in the area corresponding to the optocoupler 1220' with a certain section matted. Hence, when the optocoupler 1220' is facing the polished section, the signal generated by the optocoupler 1220' is, for example, at a high voltage level. When the optocoupler 1220' is facing the matted section, the signal generated by the optocoupler 1220' is, for example, at a low voltage level. That is, the signal generated by the optocoupler 1220' has two transitions in voltage level, one from low voltage level to high voltage level and the other from high voltage level to low voltage level, when the rotor 1100 rotates one round. In other words, the frequency of the measurement signal is, in theory, equal to the revolution frequency of the rotor 1100. However, if the rotor has a position shift owing to the vibration, the optocoupler 1220' may receive too much reflected light and generate the measurement signal at high voltage level when the optocoupler 1220' is facing the matted section because the rotor 1100 is too close to the optocoupler 1220'. Therefore, the frequency of the measurement signal may be higher than the revolution frequency of the rotor 1100. On the other hand, the optocoupler 1220' may receive less reflected light and generate the measurement signal at a low voltage level when the optocoupler 1220' is facing the polished section because the rotor 1100 is too far away from the optocoupler 1220'. Therefore, the frequency of the measurement signal may be lower than the revolution frequency of the rotor 1100. In addition, slip, deformation of the rotor, thermal expansion of the rotor may lead to similar measurement error.

The sensing circuit 1300 is electrically connected to the revolution sensor 1200 and configured to convert the measurement signal into a current revolution measured value. The measurement signal may be in the form of voltage or current. The measurement signal can only roughly indicate whether or not the revolution sensor 1200 is capable of sensing the corresponding position on the rotor 1100 and the measurement signal is not necessarily adequate for being processed by the digital circuit, so the sensing circuit 1300 is configured to convert the measurement signal into the form of pulse signal which can be processed by the digital circuit in the controller 1400. Specifically, the sensing circuit 1300 has, for example but not limited to, a comparator, a Schmidt trigger, an analog-to-digital converter (ADC), or other elements suitable for converting analog signal into digital signal.

The controller 1400 is electrically connected to the sensing circuit 1300. The controller 1400 generates the estimated revolution frequency based on the historical revolution measured value, the current revolution measured value and the reference value. The controller 1400 further generates a rotor driving signal based on the estimated revolution frequency and the revolution control signal. In one embodiment, the controller 1400 utilizes the Kalman filter or other recursive filter to generate the estimated revolution frequency based on the current revolution measured value, the reference value, and one or more historical revolution measured value. In one embodiment, please refer back to FIG. 1. The controller 1400 is electrically connected to a storage medium 1600, wherein the historical revolution measured value and the reference value are stored in the storage medium 1600. The controller 1400 write the current revolution measured value into the storage medium 1600 as the historical revolution measured value for the later calculation. The controller 1400 also updates the reference value by writing the estimated revolution frequency into the storage medium 1600. The controller 1400 is, for example but not limited to, a mono-chip controller, a micro controller unit (MCU), a field programmable gate array (FPGA), a complex programmable logic device (CPLD) or other electronic device suitable for digital signal processing. The storage medium 1600 is a volatile storage medium or a non-volatile storage medium, and preferably a non-volatile storage medium.

In one embodiment, in the procedure of generating the estimated revolution frequency, the controller 1400 first utilizes the Kalman filter to generate a corresponding current estimated value $\omega'_{k+1}$ based on the current revolution measured value $\omega_{k+1}$, the historical revolution measured value $\omega_k$ and the reference value $\omega_k'$. When the measurement error of the revolution frequency due to the aforementioned non-ideal factor is ignorable or there is no measurement error, the generated current estimated value $\omega_{k+1}'$ is substantially equal to the current revolution measured value $\omega_{k+1}$.

When the measurement error is not ignorable, the generated current estimated value $\omega_{k+1}'$ is different from the current revolution measured value $\omega_{k+1}$ but approximately equal to the actual revolution frequency of the rotor 1100. Each of the measured values and the reference value indicates the voltage level of a pulse signal which illustrates whether or not the revolution sensor 1200 senses the light.

Figure 4:
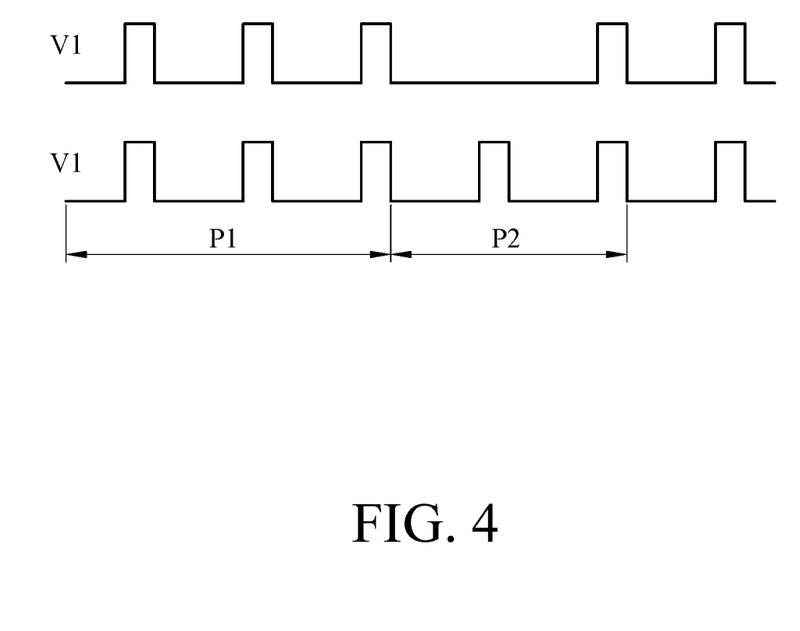
FIG. 4 is a timing diagram of the revolution frequency measured value and the estimated value according to one embodiment of the present disclosure.

Please refer to FIG. 4 for explaining the effect of the aforementioned embodiment, wherein FIG. 4 is a timing diagram of the revolution frequency measured value and the estimated value according to one embodiment of the present disclosure. As shown in FIG. 4, the signal V1 is the revolution frequency measured value which is actually measured, and the signal V2 is the estimated value obtained based on the aforementioned method. During the first timing period P1, there is no measurement error, so the signal V1 is the same as the signal V2. During the second timing period P2, the rotor driving system vibrates, so there is a period in which there is no pulse signal in the signal V1 and the mode of the signal V1 in the second timing period P2 is obviously different from that in the first timing period P1. However, the pulse pattern of the signal V2 in the first timing period is substantially the same as the pulse pattern of the signal V2 in the second timing period P2. Hence, the aforementioned measurement error due to vibration, slip, or other non-ideal factor may be prevented or reduced by calculating and controlling the system with the signal V2, which is the current estimated value.

In one embodiment, after the current estimated value $\omega_{k+1}'$ is obtained, the controller 1400 is capable of obtaining the revolution frequency of the rotor 1100 by differentiating the pulse signal p which is defined by the current estimated value $\omega_{k+1}'$. However, too much measurement error or system process error may be introduced in certain condition. Hence, in another embodiment, the controller 1400 estimates the revolution frequency of the rotor 1100 with the least square method shown below:

$$v = \frac{1}{T}hp$$

T represents the interrupt sampling time, and $\vec{i}$ is a coefficient matrix. When the estimation is performed, the coefficient matrix $\vec{i}$ is determined by determining the timing order n and the quantity of the information. A more reliable estimated revolution frequency v of the rotor can be obtained with the aforementioned equation.

After obtaining the estimated revolution frequency, the controller 1400 generates the rotor driving signal based on the estimated revolution frequency and the revolution control signal. For example, if the estimated revolution frequency is less than the revolution frequency indicated by the revolution control signal, the rotor driving signal will make the rotor driver 1500 to drive the rotor to accelerate. If the estimated revolution frequency is greater than the revolution frequency indicated by the revolution control signal, the rotor driving signal will make the rotor driver 1500 to drive the rotor to slow down. The rotor driver 1500 is, for example but not limited to, the multi-phase driver in a motor or a valve controller in an engine.

Figure 5A:
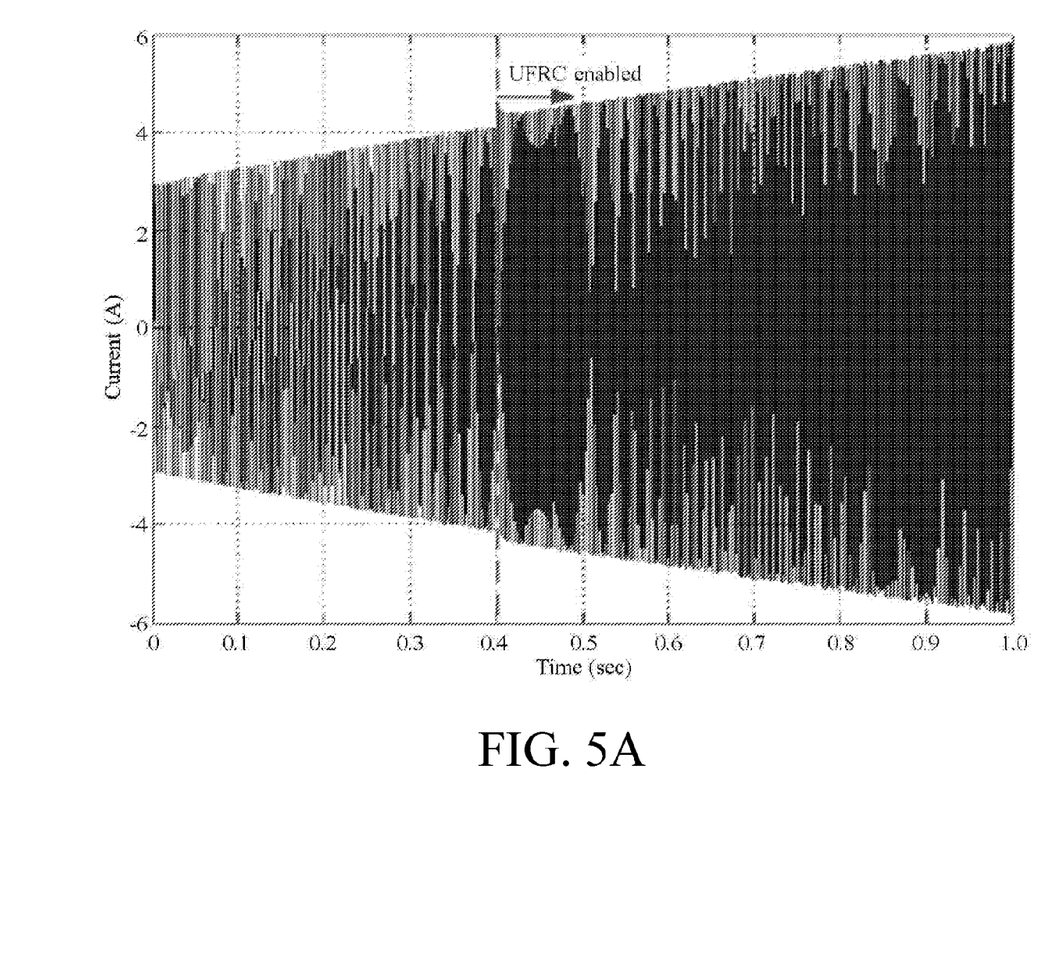
FIG. 5A is timing diagram of the rotor controlling current of a conventional rotor driving system.
Figure 5B:
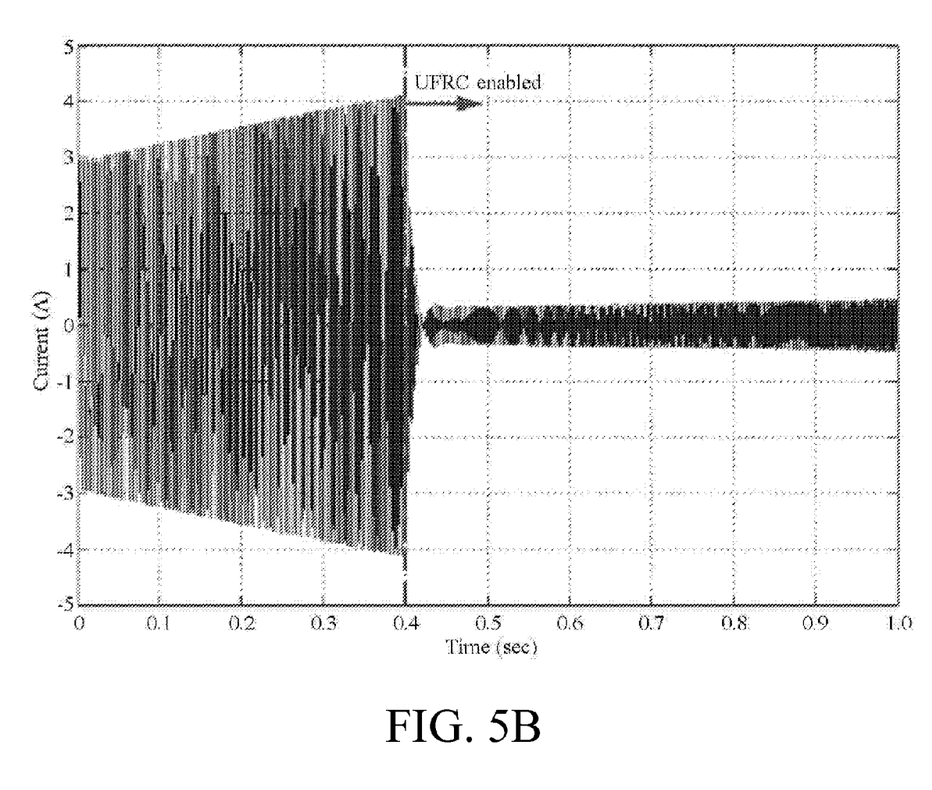
FIG. 5B is a timing diagram of the rotor controlling current of a rotor driving system according to one embodiment of the present disclosure.

In addition, the controller 1400 may generate the rotor driving signal with the Unbalance Force Rejection Control (UFRC) based on the estimated revolution frequency and the revolution control signal. Please refer to FIG. 5A and FIG. 5B, wherein FIG. 5A is timing diagram of the rotor controlling current of a conventional rotor driving system, and FIG. 5B is a timing diagram of the rotor controlling current of a rotor driving system according to one embodiment of the present disclosure. Either in FIG. 5A or in FIG. 5B, the UFRC is engaged at 0.4 second to adjust the rotor controlling current. In FIG. 5A, after the UFRC is engaged, the rotor controlling current of the conventional rotor driving system does not converge. On the contrary, it can be seen in FIG. 5B that after the UFRC is engaged, the rotor controlling current of the rotor driving system according to one embodiment of the present disclosure converges. The reason is that the UFRC of the conventional rotor driving system cannot work well because of the measurement error due to the vibration or other reasons. On the contrary, the measurement error of the revolution frequency is removed or reduced in the rotor driving system according to one embodiment of the present disclosure, so the UFRC works well.

Figure 6:
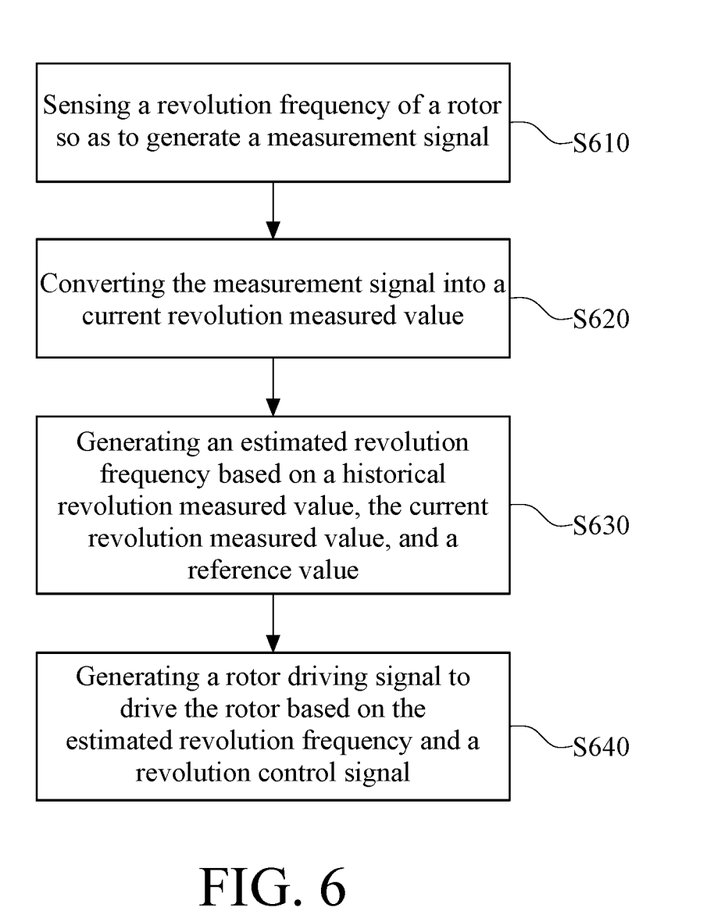
FIG. 6 is a flowchart of the method for driving rotor according to one embodiment of the present disclosure.

As above, the rotor driving system according to one embodiment of the present disclosure may be controlled with the following method. Please refer to FIG. 6, which is a flowchart of the method for driving rotor according to one embodiment of the present disclosure. As shown in FIG. 6, the method for driving rotor according to one embodiment of the present disclosure includes the following steps: As shown in step S610, the measurement signal is generated by sensing the revolution frequency of the rotor. As shown in step S620, the measurement signal is converted into the current revolution measured value. As shown in step S630, the estimated revolution frequency is generated based on the historical revolution measured value, the current revolution measured value, and the reference value. As shown in step S640, the rotor driving signal is generated based on the estimated revolution frequency and the revolution control signal to drive the rotor.

Figure 7:
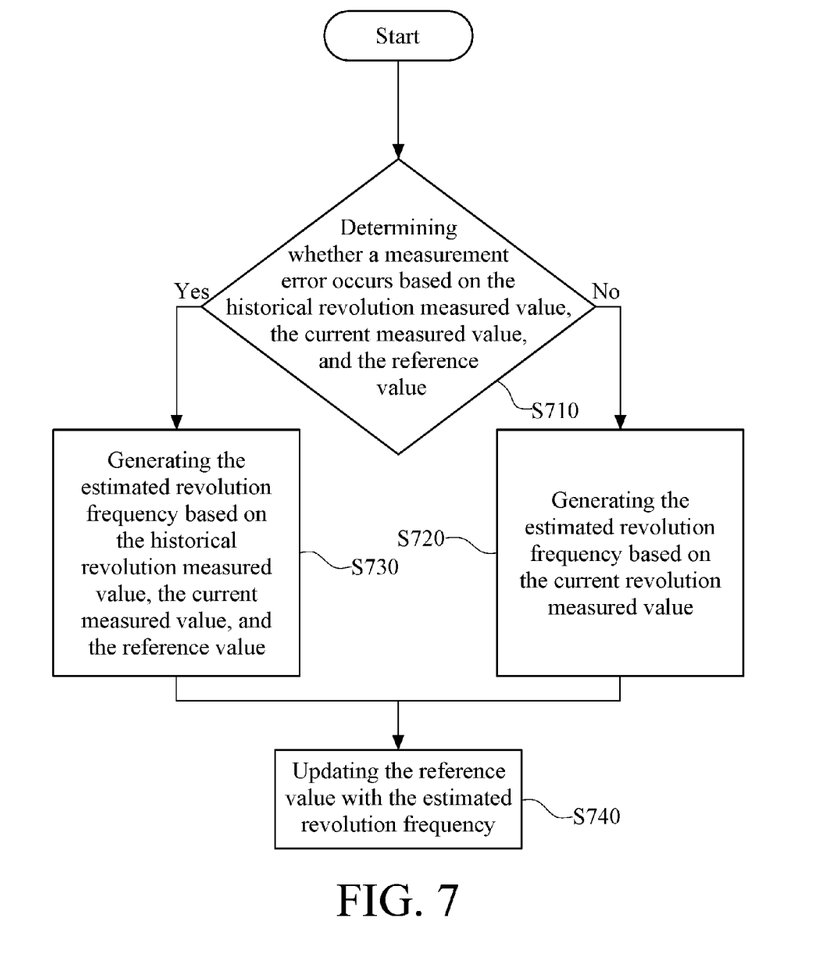
FIG. 7 is a flowchart of a method for estimating the revolution frequency according to one embodiment of the present disclosure.

As to the method for generating the estimated revolution frequency, besides to the aforementioned way of calculation, please refer to FIG. 7, which is a flowchart of a method for estimating the revolution frequency according to one embodiment of the present disclosure. As shown in step S710, whether or not a measurement error occurs is determined based on the historical revolution measured value, the current revolution measured value, and the reference value. When no measurement error occurs, as shown in step S720, the estimated revolution frequency is generated based on the current revolution measured value. When the measurement error occurs, as shown in step S730, the estimated revolution frequency is generated based on the historical revolution measured value, the current revolution measured value, and the reference value. In one embodiment, after the step S720 and the step S730, as shown in step S740, the reference value is updated with the estimated revolution frequency.

As above, the rotor driving system and the method for driving rotor achieves more accurate result in the measurement of the revolution frequency of the rotor by using the recursive filter to eliminate or reduce the measurement error, so the problem of the rotor control owing to the vibration or other non-ideal factor is prevented. In one embodiment, the system and the method according to the present disclosure provides a rotor driving system more suitable for UFRC technique.

What is claimed is:
1. A rotor driving system, comprising:
a rotor;
a revolution sensor configured to sense a revolution frequency of the rotor so as to generate a measurement signal;

a sensing circuit electrically connected to the revolution sensor and configured to convert the measurement signal into a current revolution measured value;

a controller electrically connected to the sensing circuit and configured to generate an estimated revolution frequency based on a historical revolution measured value, the current revolution measured value, and a reference value, and generate a rotor driving signal based on the estimated revolution frequency and a revolution control signal; and a rotor driver electrically connected to the controller and configured to drive the rotor to rotate based on the rotor driving signal.

2. The rotor driving system according to claim 1, wherein the rotor driver is a contact rotor driver.

3. The rotor driving system according to claim 1, wherein the rotor driver is a non-contact rotor driver.

4. The rotor driving system according to claim 1, wherein the controller generates the rotor driving signal based on the estimated revolution frequency and the revolution control signal with an unbalance force rejection control technique.

5. The rotor driving system according to claim 1, wherein the controller generates the estimated revolution frequency based on the current revolution measured value, the historical revolution measured value, and the reference value with a least square method.

6. The rotor driving system according to claim 1, further comprising a storage medium electrically connected to the controller and configured to store the reference value and the historical revolution measured value, wherein the controller updates the estimated revolution frequency with the reference value and updates the current revolution measured value with the historical revolution measured value.

7. A method for driving rotor, comprising:

sensing a revolution frequency of a rotor so as to generate a measurement signal;

converting the measurement signal into a current revolution measured value;

generating an estimated revolution frequency based on a historical revolution measured value, the current revolution measured value, and a reference value; and generating a rotor driving signal to drive the rotor based on the estimated revolution frequency and a revolution control signal.

8. The method according to claim 7, wherein the rotor driving signal is generated with an unbalance force rejection control technique based on the estimated revolution frequency and the revolution control signal.

9. The method according to claim 7, wherein the estimated revolution frequency is generated with a least square method based on the current revolution measured value, the historical revolution measured value, and the reference value.

10. The method according to claim 7, further comprising:

updating the reference value with the estimated revolution frequency; and updating the historical revolution measured value with the current revolution measured value.

\* \* \* \* \*